United States Patent
Shou et al.

(10) Patent No.: US 10,690,695 B2
(45) Date of Patent: Jun. 23, 2020

(54) SYSTEM AND METHOD FOR DETECTING DRIVING BEHAVIOR

(71) Applicant: Shanghai Xiaoyi Technology Co., Ltd., Shanghai (CN)

(72) Inventors: Jie Shou, Beijing (CN); Yangcun Chen, Beijing (CN); Yanfeng Huang, Beijing (CN)

(73) Assignee: SHANGHAI XIAOYI TECHNOLOGY CO., LTD., Shanghai (CN)

(*) Notice: Subject to any disclaimer, the term of this patent is extended or adjusted under 35 U.S.C. 154(b) by 169 days.

(21) Appl. No.: 15/917,887

(22) Filed: Mar. 12, 2018

(65) Prior Publication Data

US 2018/0267076 A1  Sep. 20, 2018

(30) Foreign Application Priority Data

Mar. 14, 2017  (CN) .......................... 2017 1 0149538

(51) Int. Cl.
*G01P 15/08* (2006.01)
*B60Q 9/00* (2006.01)
*G01P 15/18* (2013.01)
*G01P 13/00* (2006.01)
*G01P 1/12* (2006.01)

(52) U.S. Cl.
CPC ............ *G01P 15/0891* (2013.01); *B60Q 9/00* (2013.01); *G01P 1/127* (2013.01); *G01P 13/00* (2013.01); *G01P 15/0802* (2013.01); *G01P 15/18* (2013.01)

(58) Field of Classification Search
CPC .. G01P 15/0891; G01P 15/0802; G01P 1/127; G01P 15/18; G01P 13/00; B60Q 9/00
See application file for complete search history.

(56) References Cited

U.S. PATENT DOCUMENTS

| | | | |
|---|---|---|---|
| 6,438,472 B1 | 8/2002 | Tano et al. | |
| 7,565,230 B2 | 7/2009 | Gardner et al. | |
| (Continued) | | | |

FOREIGN PATENT DOCUMENTS

| | | | |
|---|---|---|---|
| CN | 1290340 A | 4/2001 | |
| CN | 101866502 A | 10/2010 | |
| (Continued) | | | |

OTHER PUBLICATIONS

SIPO Second Office Action corresponding to Application No. 201710149538.2; dated Jul. 5, 2019.

*Primary Examiner* — Hussein Elchanti
(74) *Attorney, Agent, or Firm* — Cantor Colburn LLP

(57) ABSTRACT

System and method for detecting driving behavior include a method including sampling, at a preset time interval, acceleration data of a vehicle generated by an accelerometer along a longitudinal direction of the vehicle. The accelerometer is mounted on the vehicle. The method also includes determining an average acceleration along the longitudinal direction by averaging the sampled acceleration data over a first preset time period. The average acceleration is represented by a magnitude and a direction. The method further includes when the magnitude of the average acceleration is greater than a first preset magnitude, determining an aggressive driving behavior has occurred.

15 Claims, 4 Drawing Sheets

(56) References Cited

U.S. PATENT DOCUMENTS

| | | | | |
|---|---|---|---|---|
| 2002/0165658 A1* | 11/2002 | Ament | ................. | F02D 11/105 |
| | | | | 701/110 |
| 2010/0262326 A1* | 10/2010 | Buszek | ................. | B60K 17/35 |
| | | | | 701/31.4 |
| 2013/0117173 A1* | 5/2013 | Schwarz | ................ | G06Q 40/02 |
| | | | | 705/38 |
| 2013/0151046 A1* | 6/2013 | Choi | ................ | G08G 1/096827 |
| | | | | 701/22 |
| 2015/0127191 A1* | 5/2015 | Misra | ................... | G08G 1/0112 |
| | | | | 701/1 |
| 2016/0012163 A1* | 1/2016 | Kim | ................... | G06F 17/5095 |
| | | | | 703/8 |
| 2017/0061222 A1* | 3/2017 | Hoye | ................ | G06K 9/00845 |
| 2017/0080822 A1* | 3/2017 | Lee | ........................ | B60L 58/13 |
| 2017/0356350 A1* | 12/2017 | Li | .......................... | F02D 11/02 |
| 2017/0371028 A1* | 12/2017 | Laifenfeld | ............ | G01S 13/343 |
| 2018/0194358 A1* | 7/2018 | Gaither | ............. | B60W 50/0097 |
| 2018/0267076 A1 | 9/2018 | Shou et al. | | |

FOREIGN PATENT DOCUMENTS

| | | | |
|---|---|---|---|
| CN | 101913339 | A | 12/2010 |
| CN | 102107652 | A | 6/2011 |
| CN | 102363417 | A | 2/2012 |
| CN | 102842156 | A | 12/2012 |
| CN | 102859570 | A | 1/2013 |
| CN | 103854336 | A | 6/2014 |
| CN | 105292127 | A | 2/2016 |
| CN | 105718710 | A | 6/2016 |
| CN | 106297290 | A | 1/2017 |
| CN | 107025704 | A | 8/2017 |
| WO | 2011133091 | A1 | 10/2011 |

* cited by examiner

US 10,690,695 B2

SYSTEM AND METHOD FOR DETECTING DRIVING BEHAVIOR

CROSS-REFERENCE TO RELATED APPLICATION

This application is based upon and claims priority from Chinese Patent Application No. 201710149538.2, filed on Mar. 14, 2017, the disclosure of which is expressly incorporated herein by reference in its entirety.

TECHNICAL FIELD

The present disclosure generally relates to the technical field of vehicle safety, and more specifically to a system and method for detecting driving behavior.

BACKGROUND

As automobile ownership increases, it has become highly meaningful for the improvement of vehicle safety and transportation safety to determine whether the driving behavior is potentially dangerous by analyzing a driver's driving behavior.

A cause of a large number of auto-accidents is the presence of aggressive driving behavior when the driver is driving, examples include sudden braking behavior, sudden acceleration behavior, etc.

Currently, analysis of aggressive driving behavior is conducted by collecting information on vehicle velocity and calculating its rate of change within a period of time, i.e. the acceleration value within a period of time, in order to determine whether aggressive driving behavior is occurring. Specifically, when the vehicle velocity decreases within a time period and the acceleration value is greater than a preset value, it is determined that a sudden braking behavior is occurring; when the vehicle velocity increases within a time period and the acceleration value is greater than a preset value, it is determined that a sudden acceleration behavior is occurring.

However, in the determination method described above, there can easily be significant delay in the process of obtaining the acceleration value, and the resulting driving behavior determination poorly reflects the reality.

The disclosed methods and systems address one or more of the problems listed above.

SUMMARY

Consistent with one embodiment of the present disclosure, a method for detecting driving behavior is provided. The method includes sampling, at a preset time interval, acceleration data of a vehicle generated by an accelerometer along a longitudinal direction of the vehicle. The accelerometer is mounted on the vehicle. The method also includes determining an average acceleration along the longitudinal direction by averaging the sampled acceleration data over a first preset time period. The average acceleration is represented by a magnitude and a direction. The method further includes when the magnitude of the average acceleration is greater than a first preset magnitude, determining an aggressive driving behavior has occurred.

Consistent with another embodiment of the present disclosure, an apparatus for detecting driving behavior is provided. The apparatus includes an accelerometer mounted on a vehicle. The apparatus also includes a memory storing instructions. The apparatus further includes a processor in communication with the accelerometer. The processor is configured to execute the instructions to sample, at a preset time interval, acceleration data generated by the accelerometer along a longitudinal direction of the vehicle; determine an average acceleration along the longitudinal direction by averaging the sampled acceleration data over a first preset time period, the average acceleration being represented by a magnitude and a direction; and when the magnitude of the average acceleration is greater than a first preset magnitude, determine an aggressive driving behavior has occurred.

Consistent with yet another embodiment of the present disclosure, a non-transitory computer-readable storage medium is provided. The medium stores instructions that, when executed by a processor in communication with an accelerometer mounted on a vehicle, cause the processor to perform a method for detecting driving behavior. The method includes sampling, at a preset time interval, acceleration data generated by an accelerometer along a longitudinal direction of the vehicle. The method also includes determining an average acceleration along the longitudinal direction by averaging the sampled acceleration data over a first preset time period. The average acceleration is represented by a magnitude and a direction. The method further includes when the magnitude of the average acceleration is greater than a first preset magnitude, determining an aggressive driving behavior has occurred.

It is to be understood that both the foregoing general description and the following detailed description are exemplary and explanatory only and are not restrictive of the invention, as claimed.

DESCRIPTION OF DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

Figure 1:
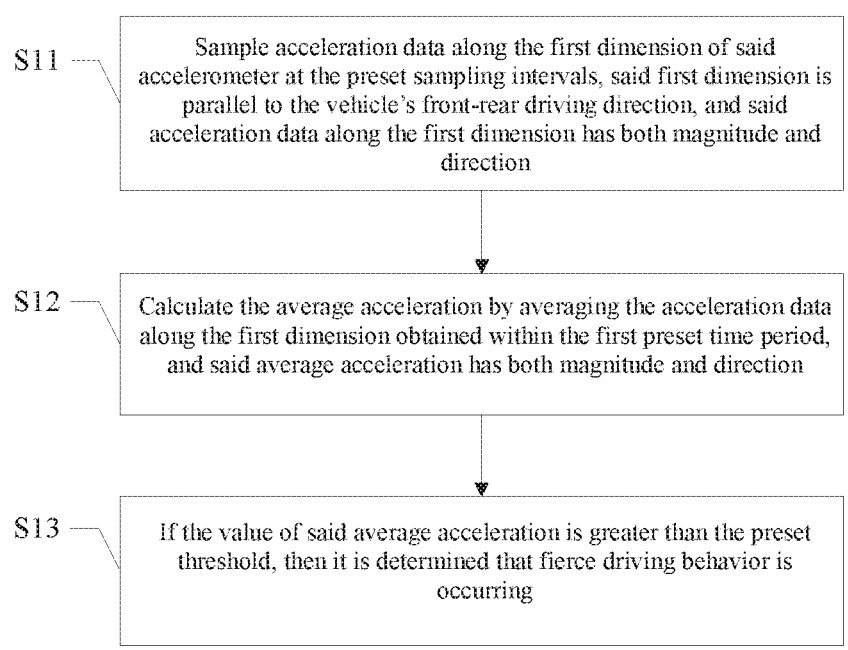
FIG. 1 is a flowchart of a driving behavior detection method, according to an exemplary embodiment of the present disclosure.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of devices and methods consistent with aspects related to the invention as recited in the appended claims.

Currently, analysis of aggressive driving behavior is conducted by collecting information on the vehicle velocity and calculating its rate of change within a period of time, i.e. the acceleration value within a period of time, in order to determine whether aggressive driving behavior is occurring. However, in the determination method described above, there can easily be significant delay in the process of obtaining the acceleration value, and the resulting driving behavior determination poorly reflects the reality.

Through research, the inventor of the present disclosure has discovered: in currently available methods that analyze aggressive driving behavior, the acceleration value is calculated from the vehicle velocity within a certain period of time, which easily leads to a significant delay in the process of obtaining the acceleration value, and the determination of aggressive driving behavior based on a single acceleration value is hardly representative of the overall driving behavior of the driver and poorly reflects the true driving behavior.

In the embodiments of the present disclosure, the acceleration data along a first dimension of an accelerometer are sampled at preset sampling intervals, the first dimension is parallel to the front-rear driving direction of the vehicle, and the acceleration data along the first dimension has both magnitude and direction; the average acceleration is calculated by averaging the acceleration data along the first dimension obtained within a first preset time period, and the average acceleration has both magnitude and direction; if the value of the average acceleration is greater than a preset threshold, then it is determined that aggressive driving behavior is occurring. This solution, which obtains acceleration data directly from the accelerometer along the front-rear driving direction of the vehicle, significantly improves the timeliness in obtaining acceleration data compared to calculating the acceleration value from the vehicle velocity within a period of time. This solution then determines whether aggressive driving behavior is occurring based on the average acceleration within a period of time, which reflects the overall driving behavior of the driver more truthfully compared to making the determination based on a single acceleration value, producing results that are more meaningful from the driving behavior analysis.

In order to make the purpose, characteristics, and benefits of the present disclosure more evident and easier to understand, detailed descriptions are provided below on specific embodiments of the present disclosure in reference to the drawings attached.

FIG. 1 is a flowchart showing a driving behavior detection method in one embodiment of the present disclosure. The driving behavior detection method includes step S11 through step S13.

Step S11: sample acceleration data along the first dimension of the accelerometer at preset sampling intervals, the first dimension is parallel to the vehicle's front-rear driving direction, and the acceleration data along the first dimension has both magnitude and direction.

Step S12: calculate the average acceleration by averaging the acceleration data along the first dimension obtained within a first preset time period, and the average acceleration has both magnitude and direction.

Step S13: if the value of the average acceleration is greater than a preset threshold, then it is determined that aggressive driving behavior is occurring.

In a specific embodiment of step S11, acceleration data may be obtained through an accelerometer placed within the vehicle; specifically, the accelerometer may be integrated into the automobile or an automobile part, or it may be externally coupled to the automobile, for example, using the accelerometer in the driving recorder.

Here, the accelerometer may include a single or multiple sensors such as piezoresistive, piezoelectric, or capacitive sensors; the acceleration value, which is proportional to the electric resistance, voltage, or capacitance, is obtained through measuring the electric resistance, voltage, or capacitance.

By the number of dimensions measured, accelerometers may be classified as 1-axis, 2-axis, or 3-axis; in one specific embodiment of the present disclosure, acceleration data needs to be collected along the first dimension at the preset sampling intervals.

Here, the first dimension is parallel to the vehicle's front-rear driving direction, and the acceleration data along the first dimension has both magnitude and direction. For example, forward motion of the vehicle may be defined as the positive direction while backward motion of the vehicle may be defined as the negative direction.

In a specific embodiment, in order to obtain the acceleration value in a more timely manner, the sampling frequency may be increased as appropriate. In a nonrestrictive example, the preset sampling intervals may be configured at any value between 50 ms and 100 ms.

In a specific embodiment of step S12, the acceleration data along the first dimension obtained within the first preset time period is averaged. When the resulting average acceleration is in a positive direction, then the vehicle's current status can be deemed as accelerating, otherwise the vehicle's current status can be deemed as decelerating.

Understandably, the first preset time period should not be configured too long, so as to avoid too small a difference in the values of average acceleration at different driving stages, which would result in failure to identify aggressive driving behavior. The first preset time period should not be configured too short either, otherwise each determination can only be based on a small number of acceleration values, which would result in failure to truthfully reflect the overall driving behavior of the driver. In a nonrestrictive example, the first preset time period may be configured between 1 s and 3 s.

In a specific embodiment of step S13, the higher the value of the calculated average acceleration is, the more aggressive the determined driving behavior is; it can be configured that when the value of the average acceleration is greater than the preset threshold, it is determined that aggressive driving behavior is occurring.

Specifically, if the value of the average acceleration is greater than the preset threshold, and the direction of the average acceleration is opposite to the direction of the vehicle's motion, then it is determined that a sudden braking driving behavior is occurring.

If the value of the average acceleration is greater than the preset threshold, and the direction of the average acceleration is the same as the direction of the vehicle's motion, then it is determined that a sudden acceleration driving behavior is occurring.

Figure 2:
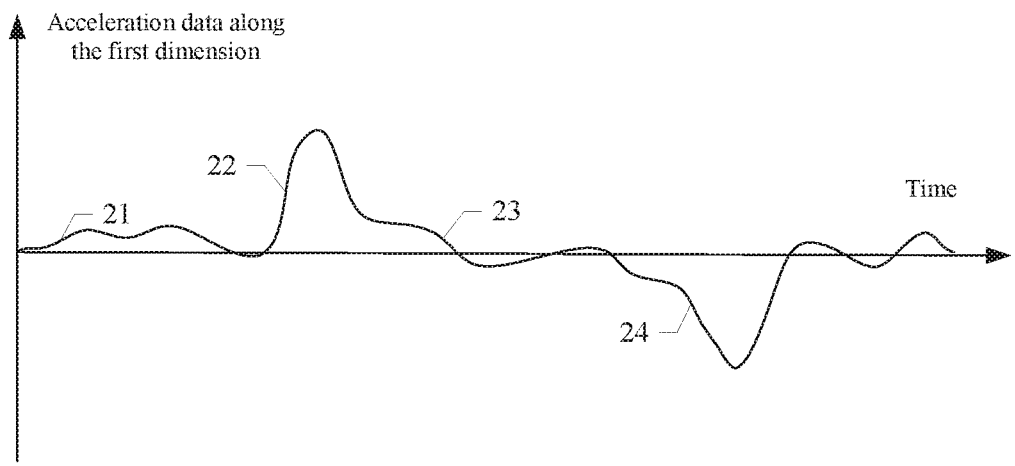
FIG. 2 is an acceleration-time series graph, according to an exemplary embodiment of the present disclosure.

FIG. 2 is an acceleration-time series graph in one embodiment of the present disclosure. The acceleration-time series graph shows the trend of change for the acceleration data along the first dimension in one driving trip. The entire trip may be viewed as including multiple segments of gentle acceleration, sudden acceleration, gentle deceleration, sudden deceleration, and smooth driving.

Specifically, driving segment 21 is a gentle acceleration segment, driving segment 22 is a sudden acceleration segment, driving segment 23 is a gentle deceleration segment, and driving segment 24 is a sudden deceleration segment.

Continuing to refer to FIG. 1, in one embodiment of the present disclosure, the determination of whether aggressive driving behavior is occurring is made by comparing the value of average acceleration calculated by averaging the acceleration data along the first dimension with the preset threshold.

Understandably, the preset threshold should not be configured too low, so as to avoid triggering the determination of aggressive driving behavior too frequently; the preset threshold should not be configured too high either, so as to avoid failure in the determination of aggressive driving behavior when highly aggressive braking or acceleration occurs, which would result in failure to truthfully reflect the actual driving situation of the driver. In a nonrestrictive example, the preset threshold may be configured between 2.6 m/s² and 2.8 m/s².

Compared to the prior art, in which the acceleration value is calculated from the vehicle velocity within a period of time, the solution provided in this embodiment of the present disclosure, where acceleration data is obtained directly through an accelerometer in the vehicle's front-rear driving direction, can significantly improve the timeliness in obtaining acceleration data. Determination of aggressive driving behavior based on average acceleration within a period of time, as compared to determination based on a single acceleration value, can reflect the overall driving behavior of the driver more truthfully, which in turn produces results that are more meaningful from the driving behavior analysis.

Further, after each determination of aggressive driving behavior, and when and only when the value of the acceleration data along the first dimension is less than the preset safety threshold, will determination be made for the next occurrence of aggressive driving behavior. Here, the preset safety threshold is less than the preset threshold.

Specifically, after each determination of sudden acceleration driving behavior or sudden deceleration driving behavior, the value of the acceleration data along the first dimension needs to reach a relatively low level for the occurrence of aggressive driving behavior to be determined as having ended. In a nonrestrictive example, the preset safety threshold may be configured at 2 m/s².

The solution provided in the embodiment of the present disclosure can prevent determining one occurrence of aggressive driving behavior as multiple occurrences. Specifically, when one occurrence of aggressive driving behavior lasts a long time, multiple samplings may be conducted, and if all the resulting values of the average acceleration is greater than the preset threshold, this single occurrence may be determined as multiple occurrences of aggressive driving behavior, which does not conform to driving habits in reality. Marking the end of one occurrence of aggressive driving behavior when the value of the acceleration data is less than the preset safety threshold, and then making the determination of the next occurrence of aggressive driving behavior, can reflect the true driving behavior of the driver and thus produce results that are more meaningful from the driving behavior analysis.

When the number of occurrences of aggressive driving events as determined in the second preset time period exceeds the first preset number of occurrences, an alarm is generated.

In a nonrestrictive example, it may be configured that an alarm will be generated for the driver if five aggressive driving events occur within one week, so as to remind the driver to drive carefully and to increase safety awareness.

Further, the alarm generated may include an application (APP), which pushes the information about the aggressive driving event to the driver via the back end. Specifically, the information about the aggressive driving event may include, among others, the number of occurrences of aggressive driving events, the acceleration data along the first dimension from the accelerometer, and the time of occurrence of aggressive driving behavior.

Figure 3:
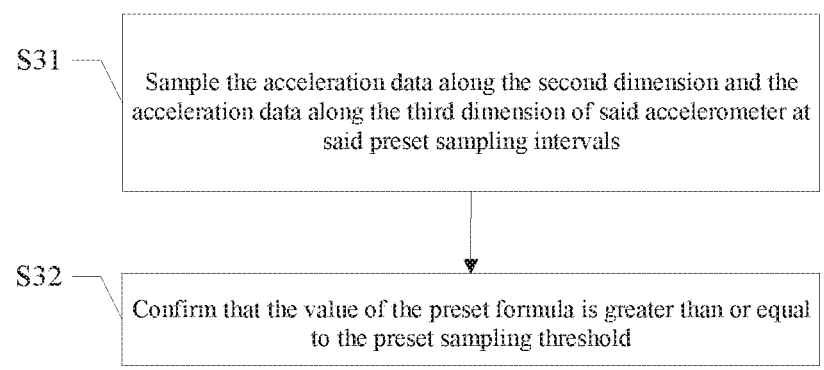
FIG. 3 is a flowchart of a driving behavior detection method, according to an exemplary embodiment of the present disclosure.

FIG. 3 is a partial flowchart for another driving behavior detection method in one embodiment of the present disclosure. The other driving behavior detection method may also include steps S31 through S32 before the acceleration data along the first dimension obtained within the first preset time period is averaged. Here, in one embodiment of the present disclosure, a 3-axis accelerometer may be used to sample the acceleration data along three dimensions. A detailed description of each of the steps is provided below.

Step S31: Sample the acceleration data along the second dimension and the acceleration data along the third dimension of the accelerometer at the preset sampling intervals.

In a specific embodiment of step S31, the acceleration data along the second dimension and the acceleration data along the third dimension have both magnitude and direction; the first dimension, second dimension, and third dimension are perpendicular to each other.

Step S32: Confirm that the value of the preset formula is greater than or equal to the preset sampling threshold.

In a specific embodiment of step S32, the preset formula is $\sqrt{x^2+y^2+z^2}$; the acceleration data along the first dimension obtained within the first preset time period is averaged after confirming that the value of this formula is greater than or equal to the preset sampling threshold.

Here, x is the value of the acceleration data along the second dimension, y is the value of the acceleration data along the third dimension, and z is the value of the acceleration data along the first dimension. Understandably, the higher the value of the formula $\sqrt{x^2+y^2+z^2}$ is, the more likely that aggressive driving behavior is occurring. In a nonrestrictive example, the first dimension, the second dimension, and the third dimension can be the z axis, x axis, and y axis, respectively, of the 3-axis accelerometer.

Further, the preset sampling threshold may be configured less than or equal to the preset threshold, so that the detection of whether true aggressive driving behavior begins when such behavior has not yet occurred or is about to occur. In a nonrestrictive example, when the preset threshold is configured 2.6 m/s², the preset sampling threshold may be configured between 2.5 m/s² and 2.6 m/s².

When using the solution provided by this embodiment of the present disclosure, a predetermination can be made with regard to whether aggressive driving behavior is about to occur by using the formula, and only when the current driving behavior is somewhat aggressive will analysis take place to analyze whether any aggressive driving behavior is occurring. This is conducive to economizing computational resources and analytical resources because calculation and analysis are not conducted when the current driving behavior is relatively gentle.

Further, only when the value of the formula $\sqrt{x^2+y^2+z^2}$ is greater than or equal to the preset sampling threshold, will the magnitude and direction of the acceleration data along the second dimension, the acceleration data along the third dimension, and the acceleration data along the first dimension of the accelerometer be stored.

In a specific embodiment, the acceleration data from the accelerometer is stored and uploaded, providing a large amount of stable and accurate driving data to an insurance company, enabling actuarial modeling. This way, the insurance company can obtain reference information that is more accurate than before when screening applicants, setting a premium, and calculating payment of claims; it can also determine a risk of driving associated with a policyholder more accurately.

However, given that the accelerometer, which normally collects and outputs acceleration data continuously at intervals of 100 ms, is fairly sensitive, storing and recording all data generated by the accelerometer puts significant pressure on the transmission and parsing of the data. Therefore, useless data from segments such as gentle acceleration, gentle deceleration, and smooth driving is screened out, which can effectively reduce the amount of data collected and processed.

In this embodiment of the present disclosure, a predetermination can be made with regard to whether aggressive driving behavior is about to occur by using the preset formula, and only when the current driving behavior is somewhat aggressive will data obtained through the accelerometer be stored. This is conducive to economizing storage resources because storage does not take place when the current driving behavior is relatively gentle.

Figure 4:
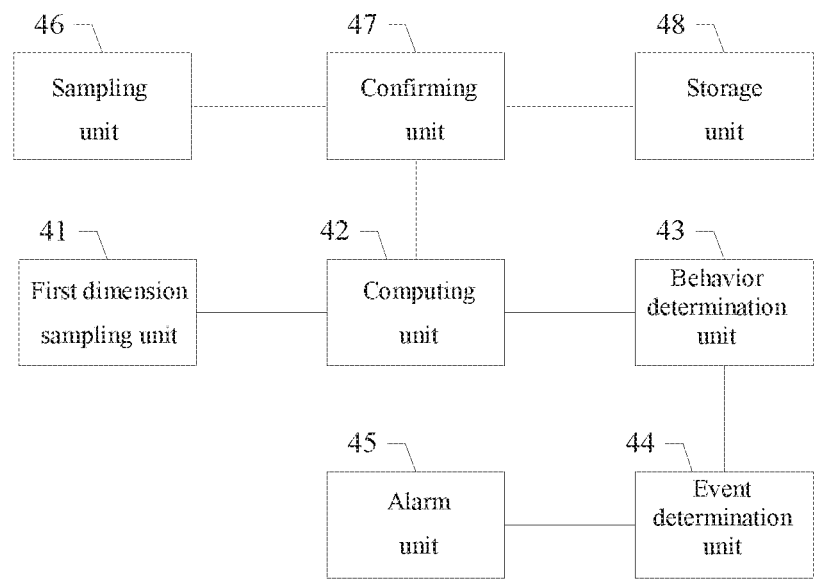
FIG. 4 is a block diagram of a driving behavior detection apparatus, according to an exemplary embodiment of the present disclosure.

FIG. 4 is a structural diagram of a driving behavior detection apparatus in one embodiment of the present disclosure. The driving behavior detection apparatus may include a first dimension sampling unit 41, a computing unit 42, a behavior determination unit 43, an event determination unit 44, an alarm unit 45, a sampling unit 46, a confirming unit 47, and a storage unit 48.

Here, the first dimension sampling unit 41 is suitable for sampling acceleration data along the first dimension of the accelerometer at the preset sampling intervals, the first dimension is parallel to the vehicle's front-rear driving direction, and the acceleration data along the first dimension has both magnitude and direction.

The computing unit 42 is suitable for averaging the acceleration data along the first dimension obtained within the first preset time period to obtain the average acceleration, and the average acceleration has both magnitude and direction.

The behavior determination unit 43 is suitable for determining the occurrence of aggressive driving behavior when the value of the average acceleration is greater than the preset threshold.

The event determination unit 44 is suitable for determining the next occurrence of aggressive driving behavior after each determination of the occurrence of aggressive driving behavior and after and only after the value of the acceleration data along the first dimension is less than the preset safety threshold. Here, the preset safety threshold is less than the preset threshold.

The alarm unit 45 is suitable for generating an alarm when the number of occurrences of aggressive driving behavior as determined within the second preset time period is greater than the first preset number of occurrences.

The sampling unit 46 is suitable for sampling the acceleration data along the second dimension and the acceleration data along the third dimension of the accelerometer at the preset sampling intervals before the acceleration data along the first dimension obtained within the first preset time period is averaged by the computing unit 42; the acceleration data along the second dimension and the acceleration data along the third dimension have both magnitude and direction, and the first dimension, second dimension, and third dimension are perpendicular to each other.

The confirming unit 47 is suitable for confirming that the formula $\sqrt{x^2+y^2+z^2}$ is greater than or equal to the preset sampling threshold. Here, x is the value of the acceleration data along the second dimension, y is the value of the acceleration data along the third dimension, and z is the value of the acceleration data along the first dimension; the preset sampling threshold is less than or equal to the preset threshold.

The storage unit 48 is suitable for storing the acceleration data along the second dimension, the acceleration data along the third dimension, and the acceleration data along the first dimension of the accelerometer when the value of the formula $\sqrt{x^2+y^2+z^2}$ is greater than or equal to the preset sampling threshold.

Figure 5:
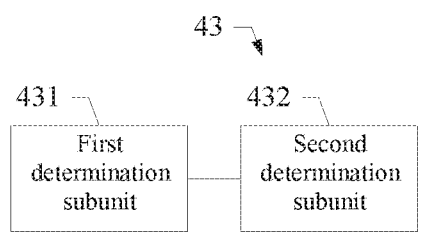
FIG. 5 is a block diagram of a behavior determination unit 43 in the driving behavior detection apparatus of FIG. 4, according to an exemplary embodiment of the present disclosure.

Further, FIG. 5 is a structural diagram of one specific embodiment of the behavior determination unit 43 in FIG. 4. Here, the behavior determination unit 43 includes a first determination subunit 431 and a second determination subunit 432.

Here, the first determination subunit 431 is suitable for determining the occurrence of sudden braking behavior when the value of the average acceleration is greater than the preset threshold and when the direction of the average acceleration is opposite to the direction of the vehicle's motion.

The second determination subunit 432 is suitable for determining the occurrence of sudden acceleration behavior when the value of the average acceleration is greater than the preset threshold and when the direction of the average acceleration is the same as the direction of the vehicle's motion.

Further details about the driving behavior detection apparatus are included in the relevant descriptions of the driving behavior detection method in the previous text and FIG. 1 through FIG. 3. No redundant description will be detailed here.

Figure 6:
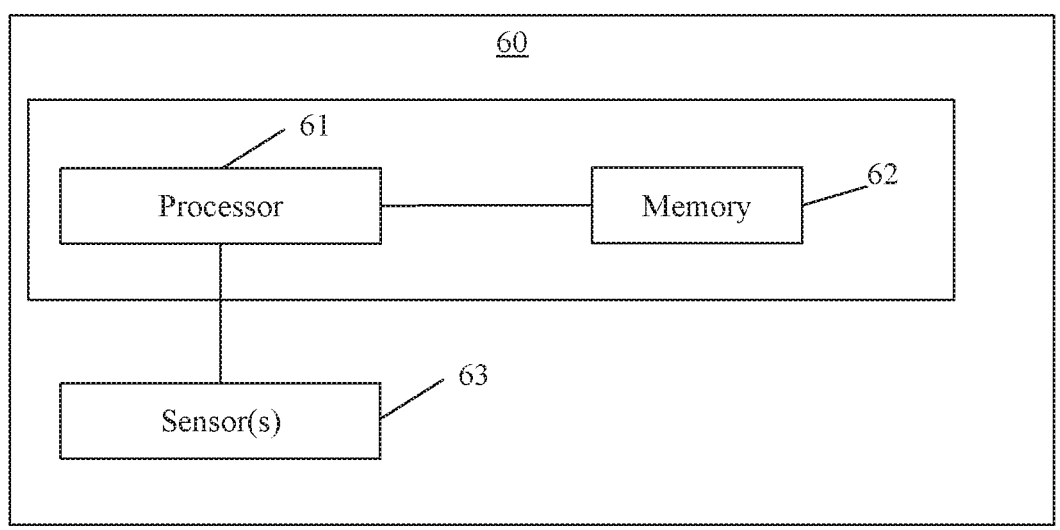
FIG. 6 is a block diagram of a driving behavior detection apparatus, according to an exemplary embodiment of the present disclosure.

FIG. 6 is a block diagram of a driving behavior detection apparatus 60, according to an exemplary embodiment of the present disclosure. As shown in FIG. 6, the driving behavior detection apparatus 60 includes a processor 61, a memory 62, and one or more sensors 63.

The sensor 63 may be mounted on a vehicle and configured to detect the movement of the vehicle. The sensor 63 may include an inertial measurement unit (IMU) that provides angular rates and acceleration of the vehicle. In some embodiments, the IMU may be a 6-degree of freedom (6 DOF) IMU that includes a 3-axis accelerometer, a 3-axis angular rate gyro, and sometimes a 2-axis inclinometer. The 3-axis angular rate gyro provides signals indicative of the pitch rate, yaw rate, and roll rate of the vehicle. The 3-axis accelerometer provides signals indicative of the acceleration of the vehicle in the x, y, and z directions. In some embodiments, multiple sensors 63 may be installed at different positions on the vehicle to measure angular rates and/or acceleration at multiple positions of the vehicles.

The processor 61 may form two-way communication with the sensor 63 via communication cables, wireless networks, or other communication mediums. For example, the processor 61 is configured to receive signals from the sensor 63 via a network (not shown in FIG. 6). The network may be any type of wired or wireless network that allows transmitting and receiving data. For example, the network may be a nationwide cellular network, a local wireless network (e.g., Bluetooth, WiFi, or LiFi), and/or a wired network. The processor 61 is configured to receive signals generated by sensor 63 and process the signals to determine a plurality of conditions regarding the vehicle and the occupants in the vehicle. The processor 61 is also configured to generate and transmit command signals to actuate the sensor 63.

In the disclosed embodiments, the processor 61 and memory 62 may be integrated into the vehicle or may be part of a device remote from the vehicle. The memory 62 is configured to store instructions executable by the processor 61. The processor 61 is configured to execute the instructions to: sample, at a preset time interval, acceleration data generated by an accelerometer (e.g., the sensor 63) along a longitudinal direction of the vehicle; determine an average acceleration along the longitudinal direction by averaging the sampled acceleration data over a first preset time period, the average acceleration being represented by a magnitude and a direction; and when the magnitude of the average acceleration is greater than a first preset magnitude, determine an aggressive driving behavior has occurred. Details regarding the operation of the processor 61 can be referred to the above method embodiments, which are not repeated herein.

In example embodiments, the present disclosure also provides a non-transitory computer-readable storage medium including instructions. These instructions may be executed by a processor, such as the processor 61, to perform the methods described above. For example, the non-transitory computer-readable storage medium may be a read-only memory (ROM), a random access memory (RAM), a CD-ROM, a magnetic tape, a floppy disk, an optical data storage device, etc.

An embodiment of the present disclosure also provides a driving recorder. The driving recorder may include the aforementioned driving behavior detection apparatus, and the driving behavior detection apparatus can execute the aforementioned driving behavior detection method. For example, the driving behavior detection apparatus may be integrated into the driving recorder, or externally coupled to the driving recorder.

Another embodiment of the present disclosure also provides an automobile. The automobile may include the aforementioned driving behavior detection apparatus, and the driving behavior detection apparatus can execute the aforementioned driving behavior detection method. For example, the driving behavior detection apparatus may be integrated into the automobile, or externally coupled to the automobile.

It is understandable to persons of ordinary skill in the art that all or part of the steps in the various methods in the aforementioned embodiments can be performed by using programs to command relevant hardware, and such programs may be stored in computer-readable storage medium, which may include: ROMs, RAMs, disks, or CDs, etc.

Notwithstanding the above disclosure of the present disclosure, it does not restrict the present disclosure. Any person of skill in the art may make various alterations and changes that are not detached from the spirit and scope of the present disclosure; therefore, the scope of protection for the present disclosure should be that as defined by the claims.

What is claimed is:

1. A method performed by a processor for detecting driving behavior, the method comprising:
    sampling, at a preset time interval, acceleration data of a vehicle generated by an accelerometer along a longitudinal direction of the vehicle, the accelerometer being mounted on the vehicle;
    determining an average acceleration along a longitudinal direction by averaging the sampled acceleration data over a first preset time period, the average acceleration being represented by a magnitude and a direction; and
    when the magnitude of the average acceleration is greater than a first preset magnitude, determining an aggressive driving behavior has occurred;
    wherein:
    the accelerometer is a 3-axis accelerometer; and
    the method further comprises before the average acceleration along the longitudinal direction is determined:
        sampling, at the preset time interval, acceleration data generated by the accelerometer along a second direction and a third direction, respectively, the longitudinal, second, and third directions being mutually perpendicular; and
        determining whether $\sqrt{x^2+y^2+z^2}$ is greater than or equal to a second preset magnitude, x being a magnitude of the acceleration data along the second direction, y being a magnitude of the acceleration data along the third direction, z being a magnitude of the acceleration data along the first direction, and the second preset magnitude being less than or equal to the first preset magnitude,
    wherein the determining of the average acceleration along the longitudinal direction is conditioned upon the $\sqrt{x^2+y^2+z^2}$ being greater than or equal to the second preset magnitude.

2. The method according to claim 1, wherein when the magnitude of the average acceleration is greater than the first preset magnitude, determining the aggressive driving behavior has occurred comprises:
    when the magnitude of the average acceleration is greater than the first preset magnitude and the direction of the average acceleration is opposite to the longitudinal direction of the vehicle, determining that the aggressive driving behavior includes a sudden braking; and
    when the magnitude of the average acceleration is greater than the first preset magnitude and the direction of the average acceleration is the same as the longitudinal moving direction of the vehicle, determining that the aggressive driving behavior includes a sudden acceleration.

3. The method according to claim 1, further comprising:
    determining a time window after the magnitude of the average acceleration exceeds the first preset magnitude and before the magnitude of the average acceleration drops below a second preset magnitude corresponds to one occurrence of aggressive driving behavior, the second preset magnitude being less than the first preset magnitude.

4. The method according to claim 3, further comprising:
    determining a number of occurrences of aggressive driving behavior within a second time duration; and
    when it is determined that the number of occurrences of aggressive driving behavior within the second time duration exceeds a preset number, generating an alarm.

5. The method according to claim 1, further comprising:
    when the $\sqrt{x^2+y^2+z^2}$ is greater than or equal to the second preset magnitude, storing, in a memory, the acceleration data along the longitudinal direction, second direction, and third direction.

6. An apparatus, comprising:
    an accelerometer mounted on a vehicle;
    a memory storing instructions; and a processor in communication with the accelerometer, the processor being configured to execute the instructions to:

sample, at a preset time interval, acceleration data generated by the accelerometer along a longitudinal direction of the vehicle;

determine an average acceleration along the longitudinal direction by averaging the sampled acceleration data over a first preset time period, the average acceleration being represented by a magnitude and a direction; and when the magnitude of the average acceleration is greater than a first preset magnitude, determine an aggressive driving behavior has occurred;

wherein:

the accelerometer is a 3-axis accelerometer; and the processor is further configured to execute the instructions to, before the average acceleration along the longitudinal direction is determined:

sample, at the preset time interval, acceleration data generated by the accelerometer along a second direction and a third direction, respectively, the longitudinal, second, and third directions being mutually perpendicular; and determine whether $\sqrt{x^2+y^2+z^2}$ is greater than or equal to a second preset magnitude, x being a magnitude of the acceleration data along the second direction, y being a magnitude of the acceleration data along the third direction, z being a magnitude of the acceleration data along the first direction, and the second preset magnitude being less than or equal to the first preset magnitude, wherein the processor determines the average acceleration along the longitudinal direction when the $\sqrt{x^2+y^2+z^2}$ is greater than or equal to the second preset magnitude.

7. The apparatus according to claim 6, wherein the processor is further configured to execute the instructions to:

when the magnitude of the average acceleration is greater than the first preset magnitude and the direction of the average acceleration is opposite to the longitudinal direction of the vehicle, determine that the aggressive driving behavior includes a sudden braking; and when the magnitude of the average acceleration is greater than the first preset magnitude and the direction of the average acceleration is the same as the longitudinal moving direction of the vehicle, determine that the aggressive driving behavior includes a sudden acceleration.

8. The apparatus according to claim 6, wherein the processor is further configured to execute the instructions to:

determining a time window after the magnitude of the average acceleration exceeds the first preset magnitude and before the magnitude of the average acceleration drops below a second preset magnitude corresponds to one occurrence of aggressive driving behavior, the second preset magnitude being less than the first preset magnitude.

9. The apparatus according to claim 8, wherein the processor is further configured to execute the instructions to:

determine a number of occurrences of aggressive driving behavior within a second time duration; and when it is determined that the number of occurrences of aggressive driving behavior within the second time duration exceeds a preset number, generate an alarm.

10. The apparatus according to claim 6, wherein the processor is further configured to execute the instructions to:

when the $\sqrt{x^2+y^2+z^2}$ is greater than or equal to the second preset magnitude, storing, in the memory, the acceleration data along the longitudinal direction, second direction, and third direction.

11. A non-transitory computer-readable storage medium storing instructions that, when executed by a processor in communication with an accelerometer mounted on a vehicle, cause the processor to perform a method for detecting driving behavior, the method comprising:

sampling, at a preset time interval, acceleration data generated by an accelerometer along a longitudinal direction of the vehicle;

determining an average acceleration along the longitudinal direction by averaging the sampled acceleration data over a first preset time period, the average acceleration being represented by a magnitude and a direction; and when the magnitude of the average acceleration is greater than a first preset magnitude, determining an aggressive driving behavior has occurred;

wherein:

the accelerometer is a 3-axis accelerometer; and the method further comprises before the average acceleration along the longitudinal direction is determined:

sampling, at the preset time interval, acceleration data generated by the accelerometer along a second direction and a third direction, respectively, the longitudinal, second, and third directions being mutually perpendicular; and determining whether $\sqrt{x^2+y^2+z^2}$ is greater than or equal to a second preset magnitude, x being a magnitude of the acceleration data along the second direction, y being a magnitude of the acceleration data along the third direction, z being a magnitude of the acceleration data along the first direction, and the second preset magnitude being less than or equal to the first preset magnitude, wherein the determining of the average acceleration along the longitudinal direction is conditioned upon the $\sqrt{x^2+y^2+z^2}$ being greater than or equal to the second preset magnitude.

12. The medium according to claim 11, wherein when the magnitude of the average acceleration is greater than the first preset magnitude, determining the aggressive driving behavior has occurred comprises:

when the magnitude of the average acceleration is greater than the first preset magnitude and the direction of the average acceleration is opposite to the longitudinal direction of the vehicle, determining that the aggressive driving behavior includes a sudden braking; and when the magnitude of the average acceleration is greater than the first preset magnitude and the direction of the average acceleration is the same as the longitudinal moving direction of the vehicle, determining that the aggressive driving behavior includes a sudden acceleration.

13. The medium according to claim 11, further comprising:

determining a time window after the magnitude of the average acceleration exceeds the first preset magnitude and before the magnitude of the average acceleration drops below a second preset magnitude corresponds to one occurrence of aggressive driving behavior, the second preset magnitude being less than the first preset magnitude.

14. The medium according to claim 13, wherein it further comprises:
- determining a number of occurrences of aggressive driving behavior within a second time duration; and
- when it is determined that the number of occurrences of aggressive driving behavior within the second time duration exceeds a preset number, generating an alarm.

15. The medium according to claim 11, further comprising:
- when the $\sqrt{x^2+y^2+z^2}$ is greater than or equal to the second preset magnitude, storing, in a memory, the acceleration data along the longitudinal direction, second direction, and third direction.

* * * * *